US008855658B2

(12) United States Patent
Charbit et al.

(10) Patent No.: US 8,855,658 B2
(45) Date of Patent: Oct. 7, 2014

(54) INTERFERENCE AVOIDANCE ON COMMON CHANNELS IN UNCOORDINATED NETWORK DEPLOYMENTS WITH FLEXIBLE SPECTRUM USE

(75) Inventors: Gilles Charbit, Farnborough (GB); Tommi Koivisto, Espoo (FI)

(73) Assignee: Nokia Corporation, Espoo (FI)

( * ) Notice: Subject to any disclaimer, the term of this patent is extended or adjusted under 35 U.S.C. 154(b) by 316 days.

(21) Appl. No.: 12/996,563

(22) PCT Filed: Jun. 1, 2009

(86) PCT No.: PCT/IB2009/005797
§ 371 (c)(1),
(2), (4) Date: Dec. 6, 2010

(87) PCT Pub. No.: WO2009/147498
PCT Pub. Date: Dec. 10, 2009

(65) Prior Publication Data
US 2011/0092200 A1  Apr. 21, 2011

Related U.S. Application Data

(60) Provisional application No. 61/131,042, filed on Jun. 4, 2008.

(51) Int. Cl.
*H04W 72/00* (2009.01)
*H04L 5/00* (2006.01)
*H04J 11/00* (2006.01)
*H04W 72/08* (2009.01)
*H04W 72/04* (2009.01)

(52) U.S. Cl.
CPC ............ *H04L 5/0007* (2013.01); *H04L 5/0053* (2013.01); *H04L 5/0062* (2013.01); *H04J 11/0069* (2013.01); *H04W 72/08* (2013.01); *H04W 72/042* (2013.01)
USPC ........ 455/450; 455/436; 455/504; 455/456.1; 455/63.1; 455/501; 455/62; 455/454; 455/435.1; 455/438; 455/442

(58) Field of Classification Search
CPC ... H04W 72/04; H04W 72/082; H04W 16/14; H04W 28/06; H04W 72/0446; H04W 72/0453; H04W 5/0007
USPC .......... 455/436, 504, 456.1, 63.1, 442, 67.11, 455/452.2, 435.1, 458, 501, 424, 450, 62, 455/454; 370/252, 337, 254, 331, 332, 458, 370/338, 350, 352, 329, 344, 203, 336
See application file for complete search history.

(56) References Cited

U.S. PATENT DOCUMENTS
5,784,368 A * 7/1998 Weigand et al. ............... 370/350
7,027,827 B2 * 4/2006 Bonta et al. .................... 455/502
(Continued)

FOREIGN PATENT DOCUMENTS
CN   1540896 A   10/2004
CN   1797992 A    7/2006
(Continued)

OTHER PUBLICATIONS
International Search Report and Written Opinion of the International Searching Authority for PCT Application No. PCT/IB2009/005797, dated Sep. 14, 2009, 18 pages.
(Continued)

*Primary Examiner* — Joseph Arevalo
(74) *Attorney, Agent, or Firm* — Harrington & Smith (57) ABSTRACT

A network access node selects one chunk of spectrum from a plurality of chunks of spectrum to be a primary chunk for a particular cell; transmits in the primary chunk from a broadcast channel BCH that contains information needed by a terminal to at least perform initial cell access; and uses a synchronization channel SCH to indicate which chunk of the plurality of chunks is the primary chunk. A user equipment receives a SCH in a particular chunk of spectrum; determines from it that one chunk is a primary chunk for a particular cell; tunes its receiver to a BCH in the primary chunk and uses information received on the BCH to obtain initial access to the particular cell. In various embodiments the SCH is only in the primary chunk or the SCH has some indication (e.g., cell ID or relative position of primary chunk) telling which chunk is primary.

18 Claims, 7 Drawing Sheets

(56) References Cited

U.S. PATENT DOCUMENTS

| | | | | |
|---|---|---|---|---|
| 7,593,449 | B2 | 9/2009 | Shattil | 375/130 |
| 7,876,786 | B2* | 1/2011 | Bahl et al. | 370/478 |
| 8,018,879 | B2 | 9/2011 | Li | 370/280 |
| 8,305,894 | B1* | 11/2012 | Zang et al. | 370/232 |
| 2004/0176039 | A1* | 9/2004 | Leyh et al. | 455/67.11 |
| 2006/0068715 | A1* | 3/2006 | Hundal et al. | 455/67.11 |
| 2007/0002898 | A1 | 1/2007 | Boariu et al. | 370/468 |
| 2008/0056183 | A1* | 3/2008 | Gorokhov et al. | 370/329 |
| 2008/0062933 | A1* | 3/2008 | Liu et al. | 370/332 |
| 2008/0253336 | A1 | 10/2008 | Parkvall et al. | 370/335 |
| 2008/0311852 | A1 | 12/2008 | Hansen et al. | 455/41.2 |
| 2009/0010213 | A1* | 1/2009 | Yamada et al. | 370/329 |
| 2009/0196180 | A1* | 8/2009 | Bahl et al. | 370/235 |
| 2009/0219910 | A1 | 9/2009 | Han et al. | 370/343 |
| 2009/0258647 | A1* | 10/2009 | Yamada et al. | 455/435.1 |
| 2010/0093363 | A1* | 4/2010 | Malladi | 455/452.2 |
| 2010/0157970 | A1* | 6/2010 | Gotman et al. | 370/344 |
| 2011/0032892 | A1* | 2/2011 | Bahl et al. | 370/329 |
| 2011/0128865 | A1* | 6/2011 | Doppler et al. | 370/252 |
| 2011/0216731 | A1 | 9/2011 | Frederiksen et al. | 370/329 |

FOREIGN PATENT DOCUMENTS

| | | |
|---|---|---|
| EP | 1892865 A1 | 2/2008 |
| WO | WO 2008/111807 A2 | 9/2008 |

OTHER PUBLICATIONS

3GPP TSG-RAN WG1 #53, R1-082024, "A Discussion on Some Technology Components for LTE-Advanced", Ericsson, Kansas City, MO, USA, May 5-9, 2008, Section 2.1, Section 2.1.2.

Akyildiz, et al., "Next Generation/Dynamic Spectrum Access/Cognitive Radio Wireless Networks: A Survey", Computer Networks, vol. 50, Issue 13, Sep. 15, 2006, pp. 2127-2159.

3rd Generation partnership project; Technical Specification Group Radio Access Network; physical layer aspects for evolved Universal Terrestrial Radio Access (UTRA) (Release 7) 3GPP TR25.814, V. 7.1.0 (Sep. 2006), p. 37, Section 7.1.2.4.1, p. 40, Section 7.1.2.4.3.

3GPP TSG-RAN WG1 #54, R1-083103, "Autonomous Component Carrier Selection for LTE-Advanced", Nokia Siemens Networks, Jeju Island/Korea in Aug. 18-22, 2008.

3GPP TSG-RAN WG1 #54bis, R1-083733, "Algorithms and Results for Autonomous Component Carrier Selection for LTE-Advanced", Nokia Siemens Networks, Prague/Czech Republic in Sep. 29-Oct. 3, 2008 (www.3gpp.org).

RP-080137, "Proposed SID on LTE-Advanced", NTT DoCoMo, 3GPP RAN#39, Puerto Vallarta, Mexico, Mar. 4-7, 2008.

R3-080812, "Solution(s) to the 36.902's Automated Configuration of Physical Cell Identity Use Case", NSN, Nokia, Shenzen, China, Apr. 2008.

3GPP TR 36.913 V0.0.6 (May 2008) 3rd Generation Partnership Project; Technical Specification Group Radio Access Network; Requirements for Further Advancements for E-UTRA (LTE-Advanced) (Release X) (16 pages).

3GPP TSG RAN WGl Meeting #53; R1-081948; Kansas City, USA, May 5-9, 2008; Proposals for LTE-Advanced Technologies (29 pages).

3GPP TS 36.300 V8.3.0 (Dec. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (121 pages).

* cited by examiner

INTERFERENCE AVOIDANCE ON COMMON CHANNELS IN UNCOORDINATED NETWORK DEPLOYMENTS WITH FLEXIBLE SPECTRUM USE

RELATED APPLICATION

This application was originally filed as PCT Application No. PCT/IB2009/005797 on Jun. 1, 2009 and claims priority to U.S. Provisional Application No. 61/131,042 filed on Jun. 4, 2008, which is incorporated herein by reference in its entirety.

TECHNICAL FIELD

The exemplary and non-limiting embodiments of this invention relate generally to wireless communication systems, methods, devices and computer programs and, more specifically, relate to interference avoidance techniques and common control channels for use in a multi-carrier cellular communication system.

BACKGROUND

Various abbreviations that may appear in the specification and/or in the drawing figures are defined as follows:
  3GPP third generation partnership project
  BCCH broadcast control channel
  BCH broadcast channel
  BW bandwidth
  DL downlink (eNB towards UE)
  eNB EUTRAN Node B (evolved Node B)
  EUTRAN evolved UTRAN (LTE)
  FSU flexible spectrum use
  ID identification
  IMT international mobile telecommunications
  IMT-A advanced IMT
  LTE long term evolution
  LTE-A LTE advanced
  MIB master information block
  Node B base station
  OFDM orthogonal frequency division multiplexing
  OFDMA orthogonal frequency division multiple access
  P-BCH physical broadcast channel
  PDCCH physical downlink control channel
  PRB physical resource block
  P-SCH primary synchronization channel
  RSSI carrier received signal strength indicator
  SC-FDMA single carrier, frequency division multiple access
  SCH synchronization channel
  S-SCH secondary synchronization channel
  UE user equipment
  UL uplink (UE towards eNB)
  UTRAN universal terrestrial radio access network
  WG working group A proposed communication system known as evolved UTRAN (E-UTRAN, also referred to as UTRAN-LTE or as E-UTRA) is currently being finalized within the 3GPP. As currently specified the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is incorporated by reference herein in its entirety. This system may be referred to for convenience as LTE Rel-8, or simply as Rel-8. Note that this is a stage 2 specification, and may not exactly describe the system as it is currently implemented. In general, the set of specifications given as 3GPP TS 36.xyz (e.g., 36.311, 36.312, etc.) may be seen as describing the entire Release 8 LTE system.

Of particular interest herein are the further releases of 3GPP LTE targeted towards future IMT-A systems, referred to herein for convenience simply as LTE-Advanced (LTE-A). Of additional interest herein are local area (LA) deployment scenarios using a scalable bandwidth (of up to, for example, 100 MHz) with flexible spectrum use (FSU). This system concept may be referred to herein for convenience as LTE-A.

It has been decided that LTE Rel-8 UEs should be able to operate in the LTE-A system. General reference in this regard may be made to 3GPP TSG RAN WG1 Meeting #53, Kansas City, USA, May 5-9, 2008, R1-081948, Proposals for LTE-Advanced Technologies, NTT DoCoMo, Inc, attached as Exhibit A to the priority document U.S. provisional patent application 61/131,042 (filed Jun. 4, 2008).

Reference can also be made to 3GPP TR 36.913, V0.0.6 (2008-05), 3rd Generation Partnership Project; Technical Specification Group Radio Access Network; Requirements for Further Advancements for E-UTRA (LTE-Advanced) (Release X), attached as Exhibit B to the priority document.

Other publications that may be interest herein include RP-080137, Proposed SID on LTE-Advanced, NTT DoCoMo, 3GPP RAN#39, Puerto Vallarta, Mexico, 4-7 Mar. 2008, attached as Exhibit C to the priority document, and R3-080812, Solution(s) to the 36.902's Automated Configuration of Physical Cell Identity Use Case, Nokia Siemens Networks, Nokia, Shenzen, China, April 2008, attached as Exhibit D to the priority document.

More specifically, there is growing interest in the cellular industry for IMT-Advanced capabilities following the approval of the Study Item description on LTE-Advanced as in RP-080137. It is foreseen that IMT-Advanced requirements (that LTE-Advanced should fulfill) will include bandwidth support (optionally) up to 100 MHz, and potentially peak data rates up to, for example, 1 Gbps (billion bits per second) for LA scenarios. As current IMT spectrum allocations do not enable multiple operators to have such high bandwidth allocations within the same band, FSU mechanisms are being examined in LTE-Advanced.

Further, it is also clear that particularly in the LA scenario there is a requirement that the Node Bs can be deployed in an uncoordinated manner (i.e., without planning the locations and configuring each individual Node B separately) without causing severe interference to neighboring cells.

SUMMARY

In accordance with one exemplary aspect of the invention there is a method comprising: selecting, with a network access node, one chunk of spectrum from a plurality of chunks of spectrum to be a primary chunk for a particular cell; transmitting in the primary chunk from the network access node a broadcast channel that contains information needed by a terminal to at least perform initial cell access; and the network access node using a synchronization channel to indicate which chunk of the plurality of chunks is the primary chunk.

In accordance with another exemplary aspect of the invention there is a computer program product comprising a computer-readable memory bearing computer program code embodied therein for use with a computer. In this aspect the computer program code comprises: code for selecting, with a network access node, one chunk of spectrum from a plurality of chunks of spectrum to be a primary chunk for a particular cell; code for transmitting in the primary chunk from the network access node a broadcast channel that contains information needed by a terminal to at least perform initial cell access; and code for the network access node using a synchronization channel to indicate which chunk of the plurality of chunks is the primary chunk.

In accordance with yet another exemplary aspect of the invention there is an apparatus comprising a processor and a transmitter. The processor is configured to select one chunk of spectrum from a plurality of chunks of spectrum to be a primary chunk for a particular cell. The transmitter is configured to transmit in the primary chunk node a broadcast channel that contains information needed by a terminal to at least perform initial cell access, and to transmit in a synchronization channel an indication of which chunk of the plurality of chunks is the primary chunk.

In accordance with still another exemplary aspect of the invention there is an apparatus comprising processing means (e.g., a processor) and sending means (e.g., a transmitter). The processing means is for selecting one chunk of spectrum from a plurality of chunks of spectrum to be a primary chunk for a particular cell. The sending means is for sending in the primary chunk node a broadcast channel that contains information needed by a terminal to at least perform initial cell access; and the sending means further for sending a synchronization channel which has an indication of which chunk of the plurality of chunks is the primary chunk.

In accordance with a further exemplary aspect of the invention there is a method comprising: receiving at a receiver a synchronization channel in a particular chunk of spectrum from a plurality of chunks of spectrum; determining by a processor from the received synchronization channel that one chunk of spectrum from the plurality of chunks of spectrum is a primary chunk for a particular cell; tuning the receiver to a broadcast channel in the primary chunk to receive information; and using the information to obtain initial access to the particular cell.

In accordance with a yet further exemplary aspect of the invention there is a computer program product comprising a computer-readable memory bearing computer program code embodied therein for use with a computer. In this aspect the computer program code comprises: code for receiving at a receiver a synchronization channel in a particular chunk of spectrum from a plurality of chunks of spectrum; code for determining by a processor from the received synchronization channel that one chunk of spectrum from the plurality of chunks of spectrum is a primary chunk for a particular cell; code for tuning the receiver to a broadcast channel in the primary chunk to receive information; and code for using the information to obtain initial access to the particular cell.

In accordance with a still further exemplary aspect of the invention there is an apparatus comprising a receiver and a processor. The receiver is configured to receive a synchronization channel in a particular chunk of spectrum from a plurality of chunks of spectrum. The processor is configured to determine from the received synchronization channel that one chunk of spectrum from the plurality of chunks of spectrum is a primary chunk for a particular cell. The processor is further configured to tune the receiver to a broadcast channel in the primary chunk to receive information for use in obtaining initial access to the particular cell In accordance with a yet further exemplary aspect of the invention there is an apparatus comprising receiving means (e.g., a receiver) and processing means (e.g., a processor).

The receiving means is for receiving a synchronization channel in a particular chunk of spectrum from a plurality of chunks of spectrum. The processing means is for determining from the received synchronization channel that one chunk of spectrum from the plurality of chunks of spectrum is a primary chunk for a particular cell. And the processing means is further for tuning the receive means to a broadcast channel in the primary chunk to receive information for use in obtaining initial access to the particular cell.

DETAILED DESCRIPTION

The exemplary embodiments of this invention may be used with uncoordinated high bandwidth deployments that may employ FSU, and are also applicable to the transmission of common channels and initial UE cell access in such a system setting. The inventors note that initial cell access setup by a UE may be influenced by a possible multiple-operator spectrum deployment, where spectrum sharing/flexible spectrum use is utilized, as the common broadcast channel typically acquired immediately after synchronization may not be in a fully fixed location due to time/frequency reuse.

In general, it is anticipated that a LTE-A UE may operate with a system bandwidth in the range 20 MHz-100 MHz. Before data transmission may occur, there is a need for the UE to carry out initial cell access. This allows the UE to acquire basic synchronization parameters, namely carrier synchronization, symbol and frame timing, as well as system information that is typically transmitted on a common broadcast channel (e.g., on the BCCH in LTE).

In LTE Rel-8 the P-SCH and S-SCH, and the P-BCH, are mapped to fixed time-frequency resources within six center-located PRBs in the system bandwidth (that may be 1.4, 3.0, 5.0, 10.0, 15.0, or 20.0 MHz). With such a configuration, for example, the P-BCH will overlap with P-BCHs of neighboring cells in a synchronous network. This may result in severe interference conditions, especially in an uncoordinated deployment. Therefore the mapping of SCH and BCH in LTE-A, assuming a system bandwidth greater than 20 MHz, should be defined with typical LA network configurations in mind, considering system robustness against other cell interference (own operator or other operator) and signaling overhead.

This being the case, a problem that arises is related to defining a time-frequency mapping for the BCH so that BCHs of different adjacent cells do not interfere with one another. This is true for a synchronous network, where the goal is to prevent the BCHs from colliding in the OFDM time-frequency grid. On the other hand, there is a conflicting requirement that the BCH location should be somehow fixed and predefined so that the initial cell access is not made overly complicated (and time consuming) for the UE.

The cell size in the considered LA scenarios may range from some tens of meters to a few hundreds of meters, and cell density is assumed to be very high relative to wide-area networks. Hence, it is likely that a distributed uncoordinated approach, rather than a centralized approach typically assumed in wide-area LTE Rel-8, would be preferable in setting up a LA cell. This enables the cell to self-configure itself, rather than obtaining the configuration from a centralized entity. This goal, combined with the fact that BCHs should preferably utilize some reuse mechanism, raises another problem related to configuring the BCH locations in an automatic manner.

The inventors note that in the considered scenarios it is typically not desirable to have a wired interface between Node Bs (such as the X2 interface between eNBs in LTE) that could be utilized for distributed configuration. This is true at least for the reason that the Node Bs may belong to different operators. Hence, there is a need to provide an automatic mechanism whereby the Node Bs can autonomously determine time-frequency resources for BCH transmissions.

To summarize, there are basically two problems that are addressed and solved by the use of the exemplary embodiments of this invention. A first problem is how to avoid excessive interference from nearby cells in an uncoordinated deployment scenario so that the UE access to the cells is not compromised or made overly complex. This is particularly troublesome for the common control channels (e.g., BCH) that typically are transmitted on pre-defined and fixed radio resources, thus overlapping with one another in a synchronous network. As interference avoidance would appear to rely on some coordination between the cells, another problem is how a Node B can itself determine the proper radio resources for common control transmission.

In the above-noted R3-080812, Solution(s) to the 36.902's Automated Configuration of Physical Cell Identity Use Case (by Nokia Siemens Networks, Nokia), it is proposed that physical cell ID selection be performed after radio environment scanning. This technique relies on a capability of the eNB to scan its radio environment before beginning to operate, at least in terms of reception of the downlink transmission band of eventual neighboring radio cells, in the frequency band where it intends to establish its own cell(s). This technique may be considered as one that uses an embedded UE receiver at the eNB. The use of this scanning phase aids the eNB in identifying potential intra-frequency neighbor cells, and to thus avoid a collision in the selection of the physical ID for its own cell. Not specifically addressed, however, is a technique for the eNB to determine how the common control channel should be mapped so that interference is avoided, or at least minimized to the greatest extent that is possible.

Figure 6:
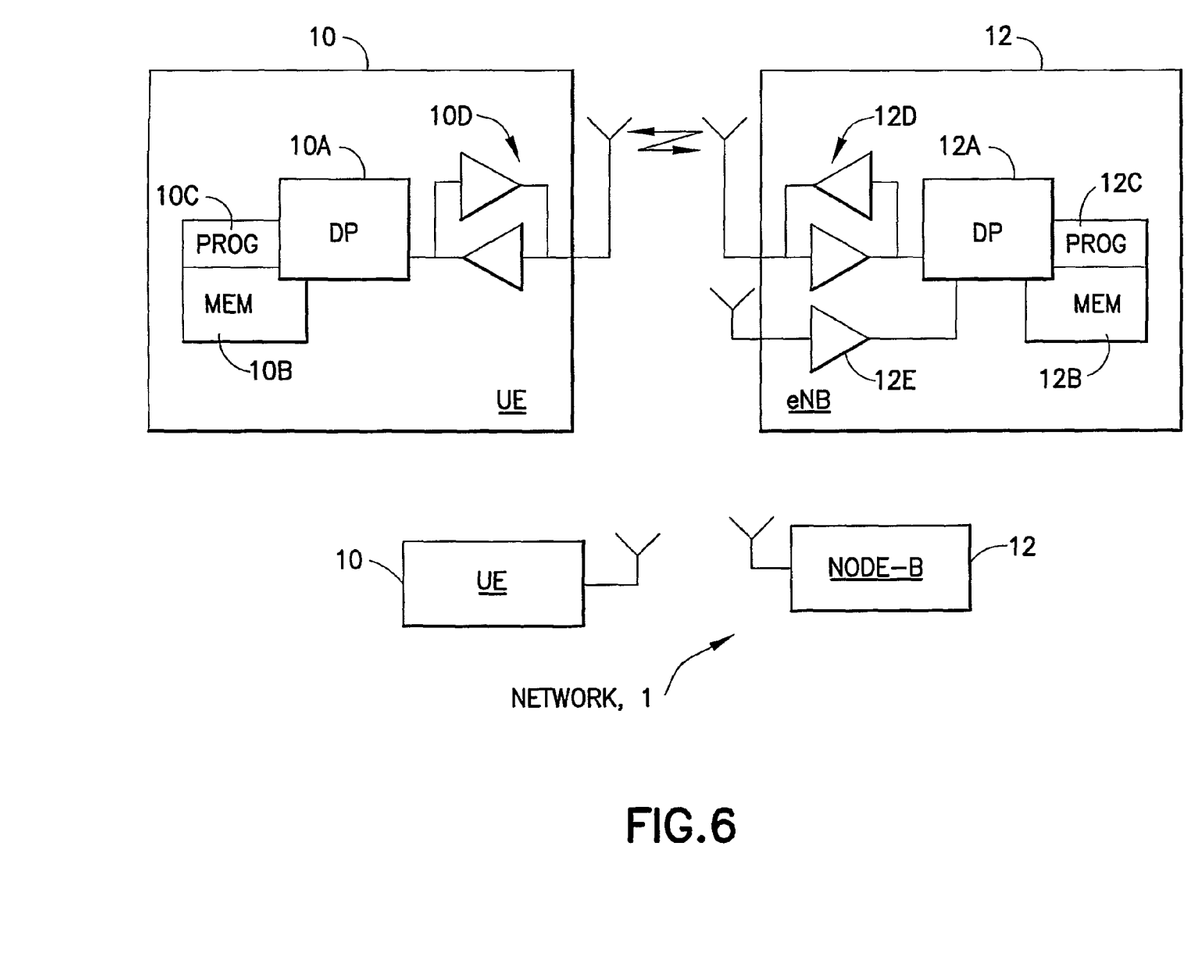
FIG. 6 is a simplified block diagram of various apparatus that can be used to implement the exemplary embodiments of this invention.

Reference is made to FIG. 6 for illustrating a simplified block diagram of various electronic devices that are suitable for use in practicing the exemplary embodiments of this invention. In FIG. 6 a wireless network 1 is adapted for communication with an apparatus 10, also referred to herein for convenience as a terminal or as a UE 10, via another apparatus, such as a network access node 12, also referred to herein for convenience as a Node B (base station) or as an eNB 12. The UE 10 includes a data processor (DP) 10A, a memory (MEM) 10B that stores a program (PROG) 10C, and a suitable radio frequency (RF) transceiver 10D coupled to one or more antennas (one shown) for bidirectional wireless communications with the eNB 12, which also includes a DP 12A, a MEM 12B that stores a PROG 12C, and a suitable RF transceiver 12D coupled to one or more antennas (two shown, though often the eNB will operate with an antenna array). At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

Typically there will be a plurality of UEs 10 serviced by the eNB 12, as well as a plurality of eNBs 12. The UEs 10 and eNBs 12 may or may not be identically constructed, but in general are all assumed to be electrically and logically compatible with the relevant network protocols and standards needed for operation in the wireless network 1. In some embodiments of this invention the Node B 12 may include an embedded UE receiver 12E.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention address and solve that various problems discussed above, and provide techniques to avoid excessive interference on common channels while maintaining ease of UE 10 access to the common channels. Further, an uncoordinated deployment of individual Node B 12s 12 is still possible, and common channel overhead in each chunk of spectrum is avoided.

Figure 1A:
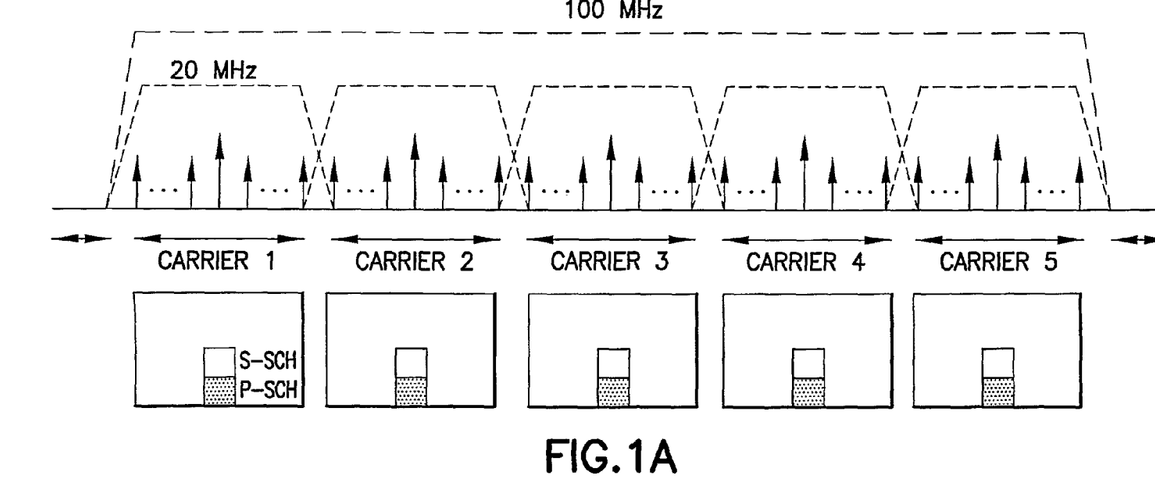
FIGS. 1A, 1B show multi-carrier channel bonding DL alternatives for Rel-9 radios.
Figure 1B:
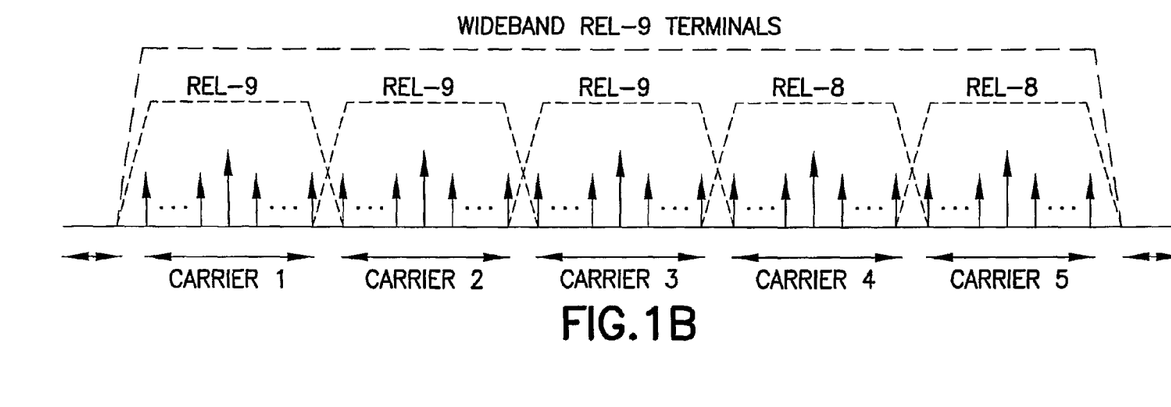

Referring to FIG. 1A, in LTE-A it is expected that the bandwidth extension from 20 MHz up to 100 MHz is performed as shown with, for example, up to five 20 MHz "chunks" are placed adjacent to each other. FIG. 1A shows the concept of extending the LTE bandwidth up to 100 MHz by channel bonding. In this example, the individual frequency chunks are shown as carriers 1 through 5, and both SCHs (S-SCH and P-SCH) are transmitted on each chunk. Wideband UEs (LTE-A UEs) will receive multiple chunks of the DL spectrum, whereas those UEs that have a bandwidth capability limited to 20 MHz (for example Rel-8 UEs) will receive only one chunk. To support also Rel-8 UEs, one or more chunks may be Rel-8 compatible (see the non-limiting example of FIG. 1B in which only carriers 4-5 are Rel-8 compatible). The exemplary embodiments of this invention pertain most particularly to a scenario where there are one or more chunks that are not Rel-8 compatible.

In the exemplary embodiments multiple operators may or may not share the same spectrum, and spectrum sharing may be done on a chunk basis, or in a more flexible manner that allows each operator to use fractions of the spectrum to improve performance in excessive interference situations.

The exemplary embodiments of this invention provide a mechanism to avoid inter-cell interference for common control channels, provide a signaling technique to enable the UE 10 to readily access to the common control channels, and provide an initial LA cell set up procedure to enable distributed automatic configuration of the LA cells by the Node Bs 12.

The exemplary embodiments of this invention enable time/frequency reuse of common control channels (e.g., the P-BCH) by defining a primary chunk (or multiple primary chunks) for each cell, and arrange for the P-BCH to be transmitted only over the primary chunk(s). To enable time/frequency reuse of primary chunks, and to facilitate UE 10 access to the primary chunk, the following embodiments are provided.

First, synchronization signals (P-SCH/S-SCH) are used to indicate the primary chunk, and therefore the location of the P-BCH. This concept may be generalized so that the synchronization signals simply indicate the location of the P-BCH, where the location does not necessarily need to be within the primary chunk, but only fixed once the SCHs have been detected.

Second, during start-up each Node B 12 scans (such as by sensing the radio environment using the embedded UE receiver 12E) which chunks are "primary" chunks for Node Bs 12 of neighboring cells, and sets up its own primary chunk so as to not coincide with a primary chunk of another neighboring Node B 12. Alternatively, or in combination with spectrum sensing, the Node Bs 12 may negotiate, over the air or by other means, the selection of the primary chunks. The P-BCH may be transmitted in the primary chunk, and the primary chunk may be linked 1-to-1 to the used PDCCH resources such that collisions on the PDCCH can also be avoided.

By the use of these exemplary embodiments interference in the P-BCHs (and possibly other channels as well) can be avoided or at least minimized, since the P-BCH within a particular cell is only transmitted over the primary chunk of that cell. In addition, the UE 10 has ready access to the P-BCH of the cell since the identity of the primary chunk can be indicated by the synchronization signals.

Describing these exemplary embodiments now in further detail, during initial cell setup the Node B 12 in one operator network determines a primary chunk and the location of the P-BCH (and therefore potentially also a "reference point" of the PDCCH). The following steps are followed by the Node B 12 in the initial cell setup. Reference is also made to the logic flow diagram of FIG. 2.

Figure 2:
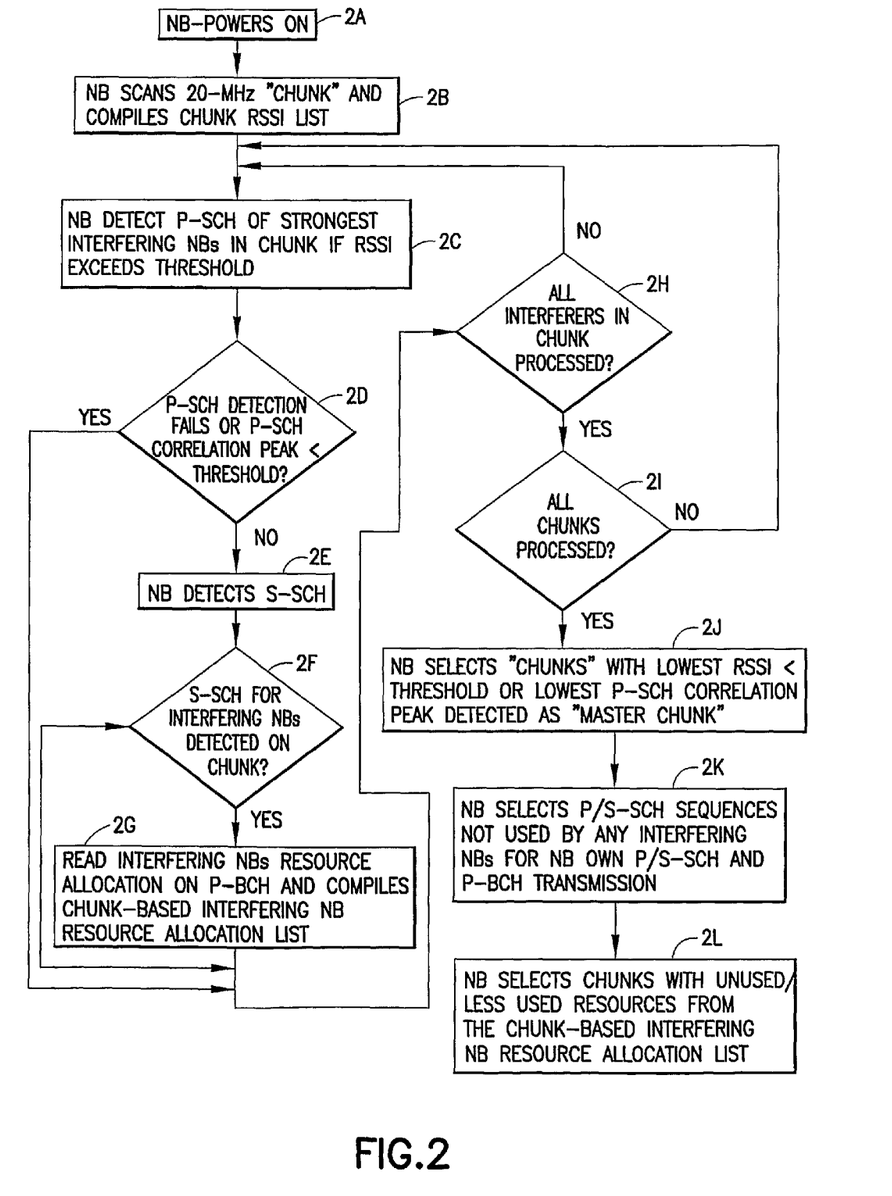
FIG. 2 is a logic flow diagram that depicts an exemplary Node B procedure for setting up a cell and determining a primary or "master" chunk.

After powering on (Block 2A) the Node B 12 scans each 20 MHz chunk in the frequency band of interest, one at a time (Block 2B). The initial chunk scanning procedure may include simple RSSI power measurements. During the scanning process the Node B 12 compiles a "chunk" RSSI list.

At Block 2C, for each chunk the Node B 12 performs the following operations. The Node B 12 attempts to detect the P-SCH of the chunk. If the measured RSSI for the chunk is less than some RSSI threshold, P-SCH detection is not attempted as the probability of failed or false detection is relatively high. If the RSSI exceeds the threshold, P-SCH detection is attempted by the Node B 12. If P-SCH detection of an interfering Node B 12 fails, or if a P-SCH detection correlation peak is less than some P-SCH correlation peak threshold (Block 2D), no further processing of the chunk is done. Otherwise, the Node B 12 attempts to detect the associated S-SCH with the detected P-SCH for each interfering Node B 12 (Block 2E). For each stronger Node B 12 interferer, if the S-SCH is detected (Block 2F) the Node B 12 reads the interfering Node B 12 resource allocation on the associated P-BCH and compiles a "chunk"-based interfering Node B 12 resource allocation list so as to be able to avoid interference also on data and control channels (Block 2G).

As a result of the execution of the procedure thus far, the Node B 12 will have knowledge of the primary chunks, P-BCH time-frequency resources, P/S-SCHs and possibly even PDCCH resources used in the neighboring cells.

At Block 2H a determination is made if all interferers in the chunk have been processed, and if so at Block 2I a determination is made if all of the chunks have been processed. If not control returns to Block 2C, otherwise control passes to Block 2J where the Node B 12 performs the following operations. At Block 2J the Node B 12 selects as the primary chunk that chunk having a lowest RSSI value (<threshold) or a lowest detected P-SCH correlation peak.

At Block 2K the Node B 12 selects P-SCH and S-SCH sequences to indicate its own primary chunk, and verifies that the selected sequences are not used by any interfering Node Bs 12. If an unused P-SCH sequence cannot be found, the Node B 12 selects a P-SCH sequence used by an interfering Node B 12 that yields the lowest cross-correlation peak (the same procedure is followed for the S-SCH).

At Block 2L the Node B 12 selects time-frequency resources for the P-BCH and possibly also for the PDCCH. Also, the Node B 12 may avoid transmitting on the resources that it knows are used for P-BCH transmission in neighboring cells. The Node B 12 also selects chunks for data/control with unused/less used resources from the chunk-based interfering Node B 12 resource allocation list to minimize interference for UEs 10 in the serving cell.

Note that the method depicted in FIG. 2 is but one non-limiting example of how the Node B 12 may perform the scanning and selection of the primary chunk, P-BCH resources and P/S-SCHs used in the neighboring cells. As one alternative implementation, the Node B 12 may only search for the P/S-SCHs to determine which chunks are "primary" chunks in neighboring cells.

Note that in principle the Node B 12 functions here in a manner analogous to a UE 10, with the embedded UE receiver 12E detecting synchronization signals from other Node Bs 12 on the DL during initial set up for synchronization purposes.

As was noted above, in lieu of scanning the Node Bs 12 may negotiate over-the-air or by some other means to determine their respective primary chunk of spectrum for transmitting the P-BCH.

Figure 3:
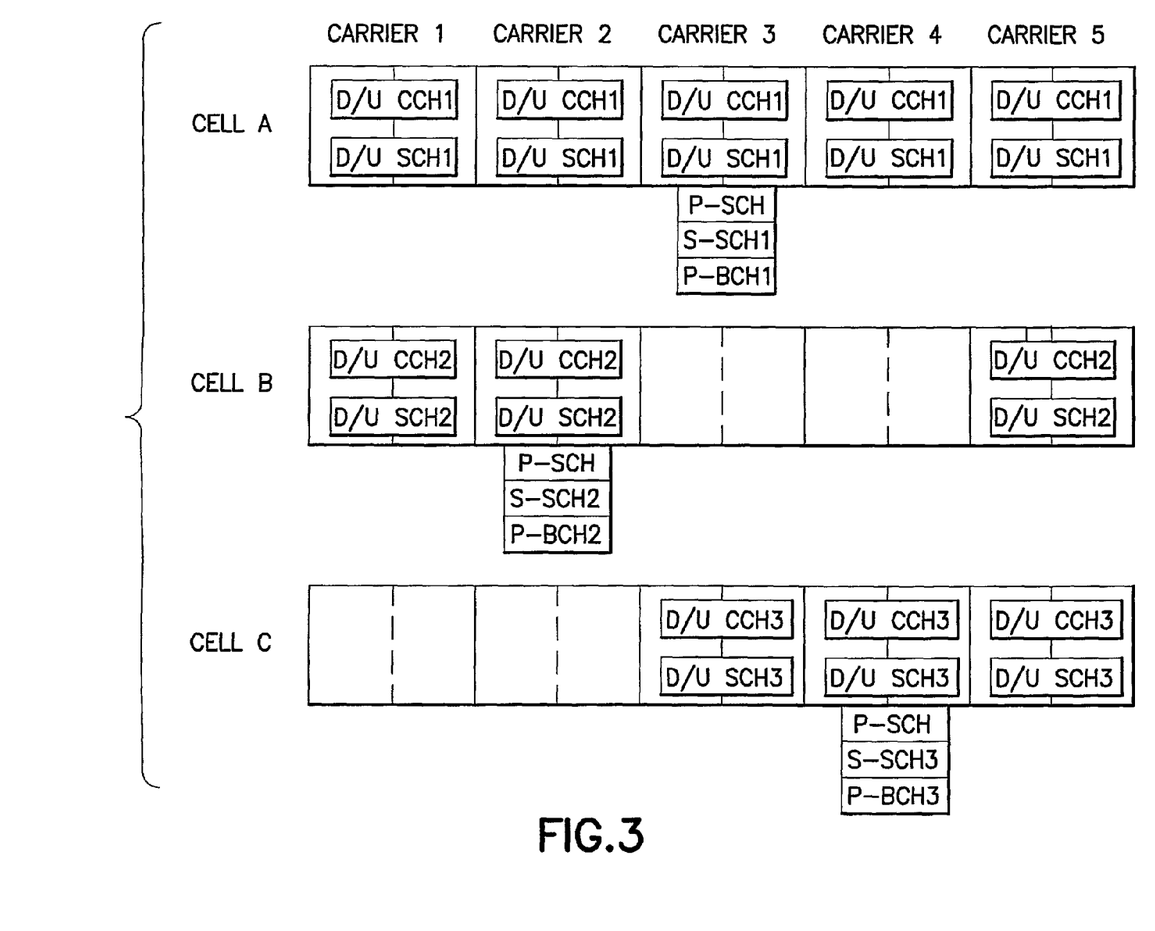
FIG. 3 shows a first embodiment wherein SCHs are transmitted only in primary chunks.
Figure 4:
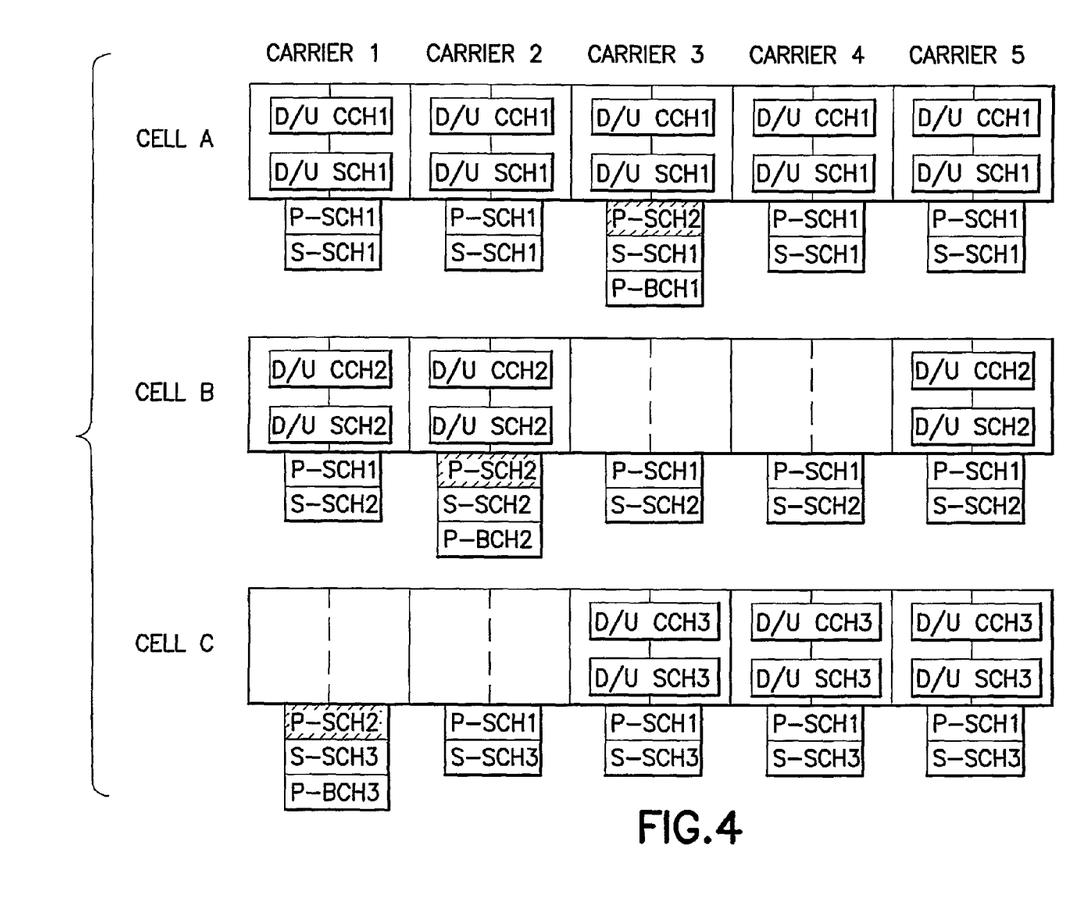
FIG. 4 shows a second embodiment wherein a P-SCH sequence for the primary chunk is different from the P-SCH on other chunks, and hence indicates the primary chunk location.
Figure 5:
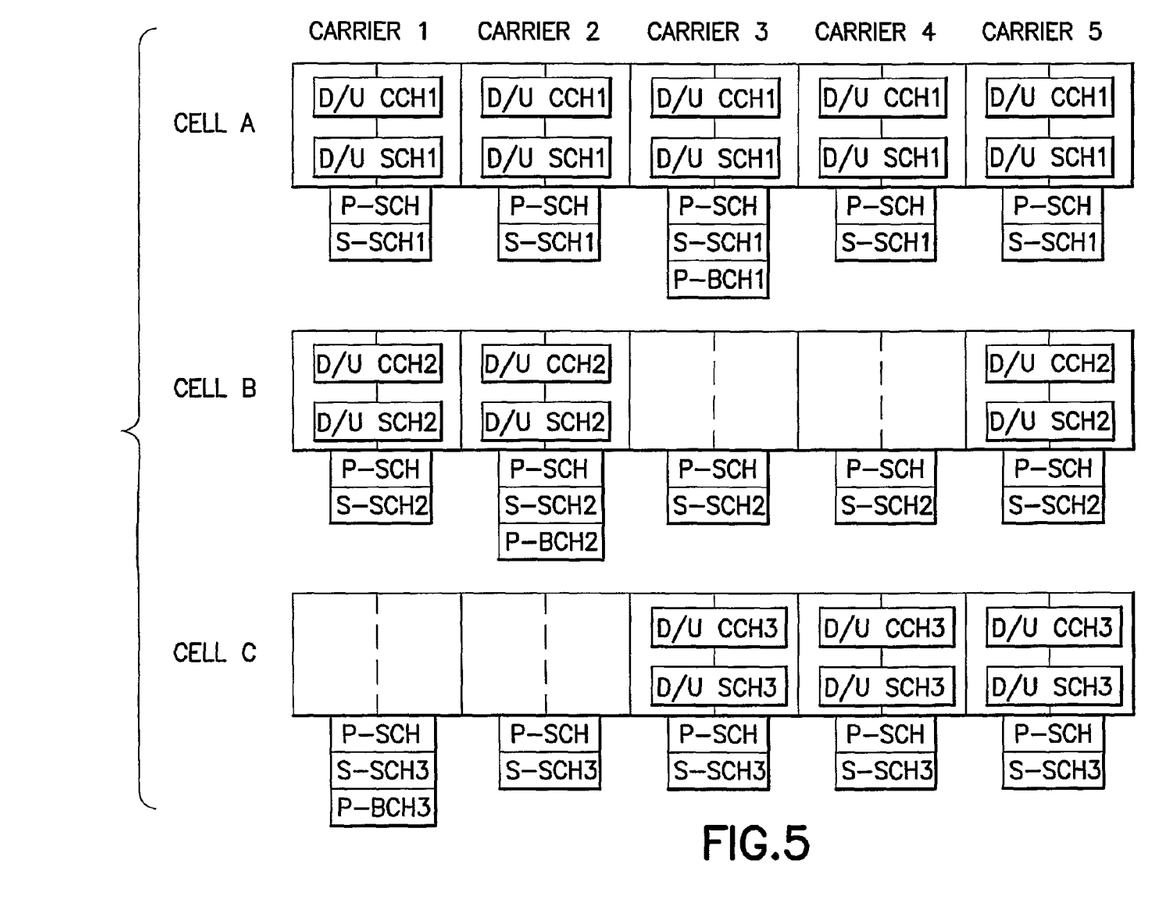
FIG. 5 shows a third embodiment wherein the S-SCH not only indicates the cell ID but also the primary chunk.

At the UE 10 primary chunk and/or P-BCH resource detection is performed based on the synchronization signals. In one embodiment the SCHs are transmitted only in the primary chunk. This is shown in FIG. 3, which shows three neighbor cells in which cell A uses carrier 3 as its primary chunk, cell B uses carrier 2 as its primary chunk, and cell C uses carrier 4 as its primary chunk. Alternatively, in another embodiment this can be accomplished by allocating a different P-SCH sequence for a primary chunk (as depicted in FIG. 4). In this case the P-SCH sequence for the primary chunk is different from the P-SCH on other chunks, and hence indicates the primary chunk location. FIG. 4 illustrates this using P-SCH2 which is offset by hashing at each of the neighbor cells, in which cell A uses carrier 3 as its primary chunk, cell B uses carrier 2 as its primary chunk, and cell C uses carrier 1 as its primary chunk. Alternatively, in a further embodiment the S-SCH sequence indicates the location of P-BCH (for example as one out of N options). This is illustrated in FIG. 5, where the S-SCH not only indicates the cell ID as in LTE (Rel-8), but also the primary chunk. In FIG. 5 all non-primary chunks have the same S-SCH sequence, and only the S-SCH sequence in the primary chunk has the additional indicator that it lies within the primary chunk. So for example at FIG. 5: the S-SCH1 sequence in carrier 3 for cell A carries the extra indictor that carrier 3 is the primary chunk for cell A and the P-BCH1 for cell A is in carrier 3; the S-SCH2 sequence in carrier 2 for cell B carries the extra indictor that carrier 2 is the primary chunk for cell B and the P-BCH2 for cell B is in carrier 2; and the S-SCH3 sequence in carrier 1 for cell C carries the extra indictor that carrier 1 is the primary chunk for cell C and the P-BCH3 for cell C is in carrier 1. In an embodiment, the extra indicator in the S-SCH sequence in the primary chunk may be implemented by means of another S-SCH sequence derived by implicit mapping from the S-SCH sequence used by all the non-primary chunks. Alternatively the S-SCH could, for example, indicate the location of the primary chunk relative to the current chunk. In a still further embodiment the P-SCH may indicate the primary chunk and the S-SCH may indicate a carrier index or the location of the current chunk relative to the primary chunk.

In a first exemplary embodiment the UE 10 would only locate the primary chunk. Note that the neighbor cell search will be an inter-frequency cell search and that a 20 MHz UE 10 will camp on the primary chunk in order to maintain timing. Note further that Rel. 8 UEs can currently perform an inter-frequency cell search, and all needed features to implement such a search are provided in Rel. 8 UEs.

In a second exemplary embodiment the UE 10 searches for the primary chunk P-SCH sequence at initial access. Once the primary chunk is found, the UE 10 immediately knows the P-BCH time-frequency resources. In the neighbor cell search, either the UE 10 performs an inter-frequency P-SCH search, as the primary chunks may employ frequency reuse, or it also searches for secondary chunk P-SCH sequences. This latter case is feasible if the MIB carried by the P-BCH is transmitted to the UE 10 by some other means, or if the UE after cell change would automatically tune to the primary chunk.

In a third exemplary embodiment the UE 10 performs cell detection using the P-SCH in a conventional manner. Once the UE 10 finds a cell it searches for the specified S-SCH sequence candidates. The S-SCH sequence that is detected then directly points to the primary chunk and/or P-BCH time-frequency resources, and the UE 10 may then access the P-BCH information. In this case there is no difference between initial and neighboring cell search.

All of these exemplary embodiments may be implemented so that backwards compatibility with Rel-8 UEs 10 is maintained. In this case the sequences for the primary chunks are selected from the specified Rel-8 set of sequences, and Rel-8 UEs 10 always camp on the primary chunk.

It should be noted that there may be more than one primary chunk per cell, and that any possible restrictions regarding UE 10 camping do not apply to LTE-A UEs.

Based on the foregoing it should be apparent that the exemplary embodiments of this invention provide a method, apparatus and computer program product(s) to enable interference avoidance for common channels in a backwards compatible, scalable multi-carrier cellular system with flexible spectrum use.

Figure 7:
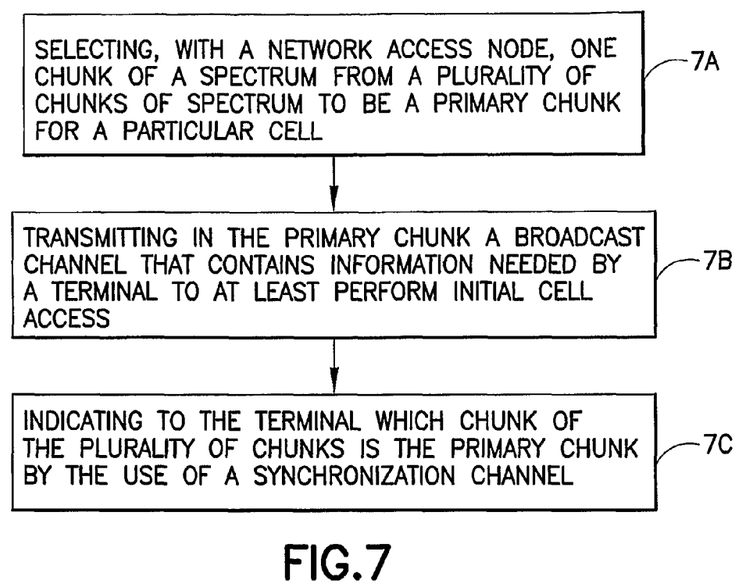
FIG. 7 is a logic flow diagram that illustrates the operation of a method, and a result of execution of computer program instructions, in accordance with an exemplary embodiment of this invention.

FIG. 7 is a logic flow diagram that illustrates the operation of a method, and a result of execution of computer program instructions, in accordance with exemplary embodiments of this invention such as from the perspective of the access node/eNB 12.

(A) At Block 7A there is a step of selecting, with a network access node, one chunk of spectrum from a plurality of chunks of spectrum to be a primary chunk for a particular cell. At Block 7B there is a step of transmitting in the primary chunk a broadcast channel that contains information needed by a terminal to at least perform initial cell access. At Block 7C there is a step of indicating to the terminal which chunk of the plurality of chunks is the primary chunk by the use of a synchronization channel.

(B) In the method, apparatus and computer program of paragraph (A), where the synchronization channel is one of a primary synchronization channel or a secondary synchronization channel.

(C) In the method, apparatus and computer program of the preceding paragraphs, where the broadcast channel is transmitted only in the primary chunk.

(D) In the method, apparatus and computer program of paragraph (A), where selecting comprises scanning for at least one of primary and secondary synchronization channels of neighboring network access nodes for selecting for use a chunk that is determined to have a lowest probability of causing excessive interference with neighboring network access nodes.

(E) In the method, apparatus and computer program of the preceding paragraph, where scanning comprises building a list ordered by measured RSSI value and/or correlation peak value.

(F) In the method, apparatus and computer program of the preceding paragraphs, further comprising selecting at least one of a primary and secondary synchronization channel sequence that is determined to have a lowest probability of causing excessive interference with neighboring network access nodes.

(G) In the method, apparatus and computer program of paragraph (A), where the synchronization channel is transmitted only in the primary chunk.

(H) In the method, apparatus and computer program of paragraph (A), where a primary synchronization channel is transmitted in all of the chunks, and where the primary synchronization channel transmitted in the primary chunk has a different sequence than the primary synchronization channels transmitted in the other chunks.

(I) In the method, apparatus and computer program of paragraph (A), where a secondary synchronization channel is transmitted in all of the chunks, and where the secondary synchronization channel transmitted in the primary chunk has a different sequence than the secondary synchronization channels transmitted in the other chunks, and further indicates the cell ID.

(J) In the method, apparatus and computer program of the preceding paragraph, where the secondary synchronization channel of a particular chunk indicates a location of the primary chunk relative to the particular chunk.

Figure 8:
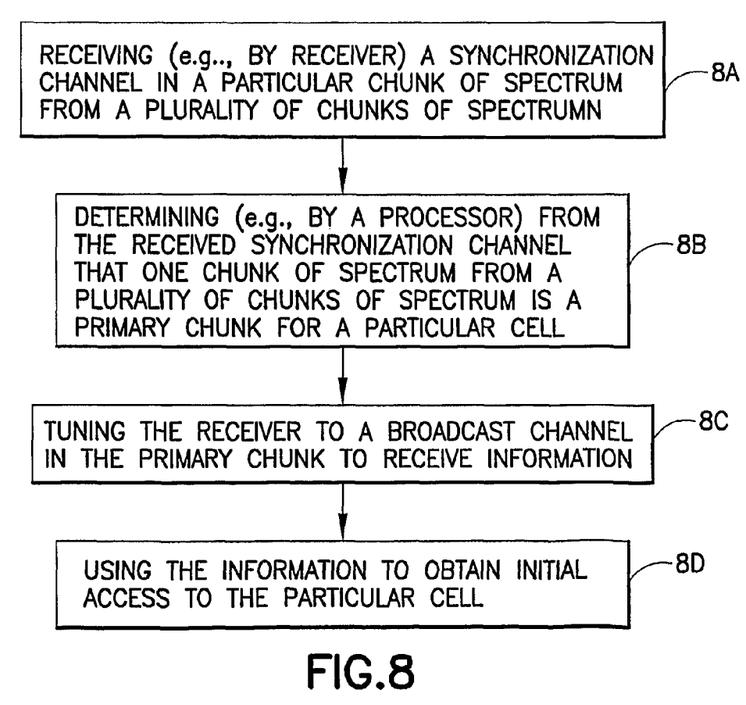
FIG. 8 is a logic flow diagram that illustrates the operation of a method, and a result of execution of computer program instructions, in accordance with another exemplary embodiment of this invention.

FIG. 8 is a logic flow diagram that illustrates the operation of a method, and a result of execution of computer program instructions, in accordance with another exemplary embodiment of this invention such as from the perspective of the user equipment UE 10.

(K) At Block 8A there is a step of receiving (e.g., by a receiver) a synchronization channel in a particular chunk of spectrum from a plurality of chunks of spectrum. At block 8B there is the step of determining (e.g., by a processor) from the received synchronization channel that one chunk of spectrum from the plurality of chunks of spectrum is a primary chunk for a particular cell. At block 8C there is the step of tuning the receiver to a broadcast channel in the primary chunk to receive information, and at block 8D there is the step of using the information to obtain initial access to the particular cell.

(L) In this UE-oriented method, apparatus and computer program the UE can also use various combinations of the elements of one or more of paragraphs (B), (C), (G), (H), (I) and (J) to efficiently find the broadcast channel. For example, the UE can determine which chunk is primary by selecting the particular chunk as the primary chunk due to the presence of the synchronization channel within the particular chunk. Or the UE can determine which chunk is primary by using received synchronization channels from at least two of the chunks of spectrum and determining which chunk of spectrum is the primary chunk from an indication within the synchronization channel in the particular chunk (e.g., which one has the cell ID, or which one has a sequence different from the others, or from an indication of relative location of the primary chunk).

The various blocks shown in FIGS. 7-8 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed the design can be used to fabricate one or more integrated circuit devices.

It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE, or Rel-8) system and the LTE-Advanced system, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method comprising:
   selecting, with a network access node, one chunk of spectrum from a plurality of chunks of spectrum to be a primary chunk for a particular cell in a wireless communication system using an uncoordinated bandwidth deployment, where each chunk of spectrum comprises a carrier comprising a plurality of channels in time-frequency resources of the carrier;
   transmitting in the primary chunk from the network access node a broadcast channel having information needed by a terminal to at least perform initial cell access; and
   the network access node using a synchronization channel to indicate which chunk of the plurality of chunks is the primary chunk; where
   selecting the primary chunk selects a chunk of spectrum that is determined to have a lowest probability of causing excessive interference with neighboring network access nodes.

2. The method according to claim 1, wherein the wireless communication system that uses an uncoordinated bandwidth deployment operates to provide flexible spectrum use (FSU).

3. An apparatus comprising:
   at least one processor;
   at least one memory including computer program code,
   the at least one memory and the computer program code are disposed at a network access node and are configured to, with the at least one processor, cause the apparatus to perform at least the following:
    select one chunk of spectrum from a plurality of chunks of spectrum to be a primary chunk for a particular cell in a wireless communication system using an uncoordinated bandwidth deployment, where each chunk of spectrum comprises a carrier comprising a plurality of channels in time-frequency resources of the carrier;
    a transmitter configured to transmit in the primary chunk a broadcast channel having information needed by a terminal to at least perform initial cell access; and
    the transmitter configured to transmit in a synchronization channel an indication of which chunk of the plurality of chunks is the primary chunk; where
    the at least one memory and the computer program code are further configured to, with the at least one processor, cause the apparatus to select the primary chunk as a chunk of spectrum that is determined to have a lowest probability of causing excessive interference with neighboring network access nodes.

4. The apparatus according to claim 3, wherein the at least one memory and computer program code are further configured to, with the at least one processor, to
    cause a receiver to scan for at least one of primary and secondary synchronization channels of neighboring network access nodes.

5. The apparatus according to claim 4, wherein the at least one memory and computer program code are further configured to, with the at least one processor, cause the apparatus at least to build and store a list ordered by measured relative signal strength indication value and/or correlation peak value after causing the receiver to scan.

6. The apparatus according to claim 3, wherein the transmitter is configured to transmit a synchronization channel only in the primary chunk.

7. The apparatus according to claim 3, wherein the transmitter is configured to transmit a primary synchronization channel in each of the chunks, such that the primary synchronization channel transmitted in the primary chunk has a different sequence than the primary synchronization channels transmitted in each of the other chunks.

8. The apparatus according to claim 3, wherein the transmitter is configured to transmit a secondary synchronization channel in each of the chunks, such that the secondary synchronization channel transmitted in the primary chunk has an identifier for the particular cell that is not within the secondary synchronization channels transmitted in the other chunks.

9. The apparatus according to claim 3, wherein the transmitter is configured to transmit a primary or secondary synchronization channel in a particular chunk that indicates a location of the primary chunk relative to the particular chunk.

10. The apparatus according to claim 3, wherein the wireless communication system that uses an uncoordinated bandwidth deployment operates to provide flexible spectrum use (FSU).

11. A computer program product comprising a computer-readable memory bearing computer program code embodied therein for use with a computer, the computer program code comprising:
    code for selecting, with a network access node, one chunk of spectrum from a plurality of chunks of spectrum to be a primary chunk for a particular cell in a wireless communication system using an uncoordinated bandwidth deployment, where each chunk of spectrum comprises a carrier comprising a plurality of channels in time-frequency resources of the carrier;
    code for transmitting in the primary chunk from the network access node a broadcast channel having information needed by a terminal to at least perform initial cell access; and
    code for the network access node using a synchronization channel to indicate which chunk of the plurality of chunks is the primary chunk; where
    the code for selecting the primary chunk selects a chunk of spectrum that is determined to have a lowest probability of causing excessive interference with neighboring network access nodes.

12. A method comprising:
    receiving at a receiver a synchronization channel in a particular chunk of spectrum from a plurality of chunks of spectrum in a wireless communication system using an uncoordinated bandwidth deployment, where each chunk of spectrum comprises a carrier comprising a plurality of channels in time-frequency resources of the carrier, the synchronization channel being received from a network access node;
    determining by a processor from the received synchronization channel that one chunk of spectrum from the plurality of chunks of spectrum is a primary chunk for a particular cell;
    tuning the receiver to a broadcast channel in the primary chunk to receive information; and
    using the information to obtain initial access to the particular cell; where
    the primary chunk of spectrum is a chunk of spectrum that is predetermined to have a lowest probability of causing excessive interference with any neighboring network access nodes.

13. The method according to claim 12, in which determining comprises at least one of:
    selecting the particular chunk as the primary chunk due to the presence of the synchronization channel within the particular chunk; and
    receiving synchronization channels from at least two of the chunks of spectrum and determining which chunk of spectrum is the primary chunk from an indication within the synchronization channel in the particular chunk.

14. The method according to claim 12, wherein the wireless communication system that uses an uncoordinated bandwidth deployment operates to provide flexible spectrum use (FSU).

15. An apparatus comprising:
    a receiver configured at a network access node to receive a synchronization channel in a particular chunk of spectrum from a plurality of chunks of spectrum in a wireless communication system using an uncoordinated bandwidth deployment, where each chunk of spectrum comprises a carrier comprising a plurality of channels in time-frequency resources of the carrier;
    at least one processor;
    at least one memory including computer program code,
    the at least one memory and the computer program code configured to, with the at least one processor, cause the apparatus to perform at least the following:
    determine from the received synchronization channel that one chunk of spectrum from the plurality of chunks of spectrum is a primary chunk for a particular cell; and
    tune the receiver to a broadcast channel in the primary chunk to receive information for use in obtaining initial access to the particular cell; where
    the primary chunk is a chunk of spectrum that is determined to have a lowest probability of causing excessive interference with neighboring network access nodes.

16. The apparatus according to claim 15, wherein the at least one memory and computer program code are further configured to, with the at least one processor, cause the apparatus at least to determine the primary chunk by at least one of:
  selecting the particular chunk as the primary chunk due to the presence of the synchronization channel within the particular chunk; and
  reading synchronization channels received from at least two of the chunks of spectrum and determining which chunk of spectrum is the primary chunk from an indication within the synchronization channel in the particular chunk.

17. The apparatus according to claim 15, wherein the wireless communication system that uses an uncoordinated bandwidth deployment operates to provide flexible spectrum use (FSU).

18. A computer program product comprising a computer-readable memory bearing computer program code embodied therein for use with a computer, the computer program code comprising:

code for receiving from a network access node at a receiver a synchronization channel in a particular chunk of spectrum from a plurality of chunks of spectrum in a wireless communication system using an uncoordinated bandwidth deployment, where each chunk of spectrum comprises a carrier comprising a plurality of channels in time-frequency resources of the carrier;

code for determining by a processor from the received synchronization channel that one chunk of spectrum from the plurality of chunks of spectrum is a primary chunk for a particular cell;

code for tuning the receiver to a broadcast channel in the primary chunk to receive information; and code for using the information to obtain initial access to the particular cell; where the primary chunk is a chunk of spectrum that is determined to have a lowest probability of causing excessive interference with neighboring network access nodes.

* * * * *